United States Patent
Zhang et al.

(10) Patent No.: US 8,539,213 B2
(45) Date of Patent: Sep. 17, 2013

(54) MANAGEABILITY EXTENSION MECHANISM FOR SYSTEM FIRMWARE

(75) Inventors: Tao Zhang, Shanghai (CN); Jianfeng Mei, Changning District (CN); Lechong Chen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1179 days.

(21) Appl. No.: 10/550,473

(22) PCT Filed: Dec. 31, 2004

(86) PCT No.: PCT/CN2004/001587
§ 371 (c)(1),
(2), (4) Date: Mar. 11, 2008

(87) PCT Pub. No.: WO2006/069492
PCT Pub. Date: Jul. 6, 2006

(65) Prior Publication Data
US 2008/0209193 A1   Aug. 28, 2008

(51) Int. Cl.
*G06F 9/24* (2006.01)
*G06F 9/00* (2006.01)
*G06F 15/177* (2006.01)
*G06F 9/445* (2006.01)

(52) U.S. Cl.
USPC ............ 713/1; 713/2; 713/100; 717/174

(58) Field of Classification Search
None
See application file for complete search history.

(56) References Cited

U.S. PATENT DOCUMENTS

| | | | |
|---|---|---|---|
| 6,122,733 A * | 9/2000 | Christeson et al. | 713/2 |
| 6,272,629 B1 * | 8/2001 | Stewart | 713/2 |
| 6,282,647 B1 * | 8/2001 | Leung et al. | 713/100 |
| 6,438,688 B1 * | 8/2002 | Nunn | 713/2 |
| 6,442,067 B1 * | 8/2002 | Chawla et al. | 365/185.11 |
| 6,536,038 B1 | 3/2003 | Ewertz et al. | |
| 6,564,318 B1 * | 5/2003 | Gharda et al. | 713/1 |
| 6,601,212 B1 * | 7/2003 | Guha et al. | 714/776 |
| 6,622,246 B1 * | 9/2003 | Biondi | 713/100 |
| 6,725,178 B2 * | 4/2004 | Cheston et al. | 702/186 |
| 6,795,912 B1 * | 9/2004 | Itoh et al. | 713/2 |
| 7,146,412 B2 * | 12/2006 | Turnbull | 709/220 |
| 7,210,010 B2 * | 4/2007 | Ogle | 711/162 |
| 2002/0169979 A1 * | 11/2002 | Zimmer | 713/200 |

(Continued)

FOREIGN PATENT DOCUMENTS

| | | |
|---|---|---|
| CN | 1536481 | 10/2004 |
| JP | 11149379 A | 6/1999 |

OTHER PUBLICATIONS

Office Action from Counterpart China Patent Application No. 200480044725.5, dated Aug. 8, 2008 (10 pgs. Translation included).

(Continued)

*Primary Examiner* — Ji H Bae
(74) *Attorney, Agent, or Firm* — Blakely, Sokoloff, Taylor & Zafman LLP (57) ABSTRACT

A method and system to manage an extension mechanism for firmware is described. A firmware binary file is stored in an extension area of a storage device of a computer system. The Basic Input/Output System (BIOS) of the computer system is modified to access the stored firmware binary file stored in the extension area. In one embodiment, the computer system is Extensible Firmware Interface (EFI) compliant.

21 Claims, 6 Drawing Sheets

(56) References Cited

U.S. PATENT DOCUMENTS

| | | | |
|---|---|---|---|
| 2003/0097581 A1* | 5/2003 | Zimmer | 713/200 |
| 2003/0188173 A1* | 10/2003 | Zimmer et al. | 713/189 |
| 2003/0217255 A1* | 11/2003 | Wyatt | 713/100 |
| 2003/0217358 A1* | 11/2003 | Thurston et al. | 717/174 |
| 2004/0015941 A1* | 1/2004 | Sekine | 717/168 |
| 2004/0017708 A1* | 1/2004 | Choi et al. | 365/200 |
| 2004/0123093 A1* | 6/2004 | Rothman et al. | 713/2 |
| 2004/0236936 A1* | 11/2004 | Bulusu et al. | 713/2 |
| 2004/0268141 A1 | 12/2004 | Zimmer et al. | |
| 2005/0052228 A1* | 3/2005 | Yeh et al. | 330/10 |
| 2006/0123223 A1* | 6/2006 | Mayfield et al. | 713/2 |

OTHER PUBLICATIONS

Office Action from foreign counterpart China Patent Application No. 200480044725.5, mailed Feb. 6, 2008, 9 pages (translation included).

Preliminary Report on Patentability Application No. PCT/CN2004/001587, mailed Jul. 12, 2007, 5 pages.

International Search Report and Written Opinion Application No. PCT/CN2004/001587, mailed Oct. 10, 2005, 10 pages.

Third Office Action from foreign counterpart China Patent Application Serial No. 200480044725.5, mailed Jun. 5, 2009, 7 pages.

\* cited by examiner

MANAGEABILITY EXTENSION MECHANISM FOR SYSTEM FIRMWARE

CROSS-REFERENCE TO OTHER APPLICATIONS

This is a National Phase of International Application No. PCT/CN2004/001587, filed on Dec. 31, 2004, which claims priority of this date.

FIELD

At least one embodiment pertains to computer systems, and more particularly to managing firmware of a computer system.

PRIOR ART AND RELATED ART

A computer system is self-tested and initialized through loading and execution of system firmware during boot-up. This firmware is commonly referred to as Basic Input/Output System (BIOS). Typically, the BIOS provides an interface between the operating system and the peripheral hardware of a computer system. At the start of a boot-up of a computer system, very little of the system beyond the processor and firmware is actually initialized. The code in the firmware initializes the system to the point that an operating system takes control of the system.

In modern computer systems, non-volatile memory devices, such as a flash memory device, store the BIOS. Computer systems and hardware peripherals usually store an original firmware image in their respective non-volatile memory device. In order to update that firmware, all data that is stored in the non-volatile memory device must be overwritten.

BIOSs are usually updated to adapt to new peripheral technologies. However, updating firmware in a computer system may cause undesired results if not done properly. For example, a computer system may no longer function if after updating the firmware the boot block does not match the hardware configuration. Due to the potential problems that could occur when updating firmware, independent BIOS vendors (IBVs) and hardware manufacturers normally do not allow unfettered access to their BIOS for third parties such as independent software vendors (ISVs) to add additional capabilities into the BIOS.

DETAILED DESCRIPTION

A method and system for a manageability extension mechanism for computer system firmware are described below. In the following description, numerous specific details are set forth, such as embodiments pertaining to the Extensible Firmware Interface (EFI) framework specification, in order to provide a thorough understanding of the present invention. It will be apparent to one skilled in the art, that the present invention may be practiced without these specific details. In other instances, well-known designs and implementations are not described in detail in order to facilitate description.

In order for a third party, such as an independent software vendor (ISV), to incorporate additional functionality or applications to the firmware of a computer system or device, the entire firmware is normally overwritten. Applications that run under a firmware environment are called firmware applications. Firmware applications are one way of providing a manageability solution that ensures the usability, security and integration of computer systems, including provisioning, anti-theft, anti-virus, hardware/software asset management, and disk image management. In order to meet security and stability requirements, manageability solutions are required to be invisible in the operating system and executed external to the operating system.

Figure 1:
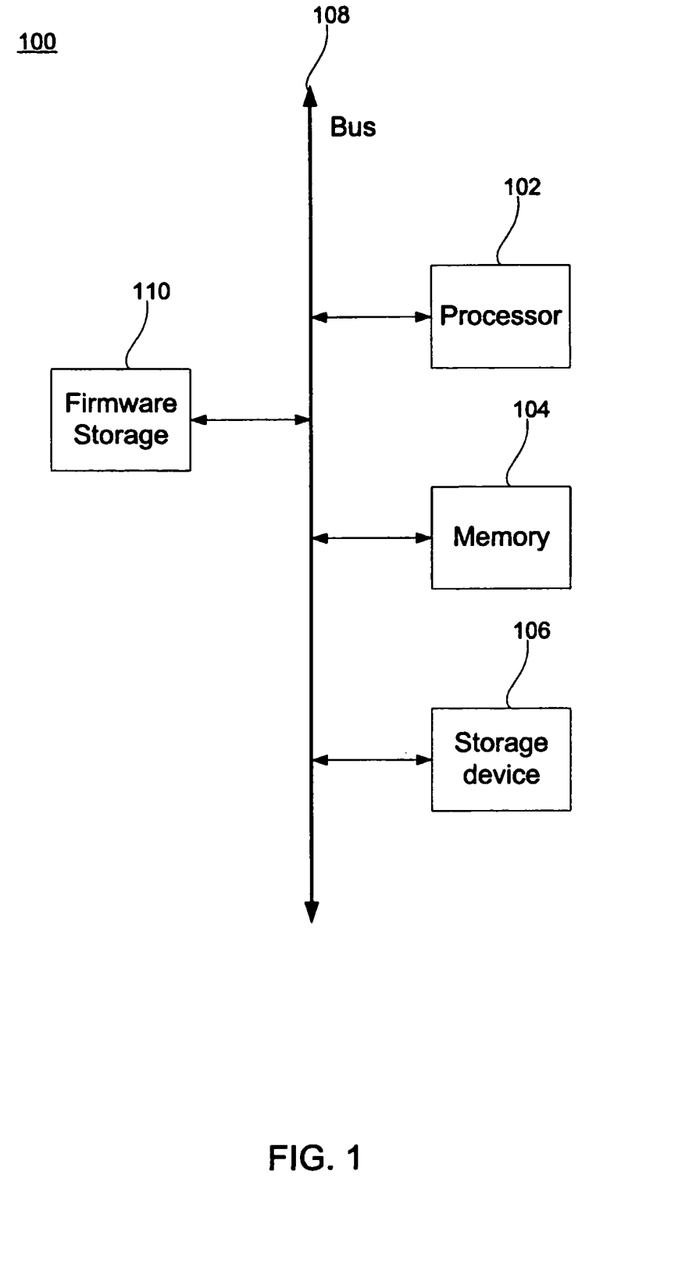
FIG. 1 is a schematic diagram illustrating a computer system in accordance with an embodiment of the invention.

FIG. 1 depicts a computer system 100 in accordance with an embodiment of the invention. The computer system 100 includes a processor 102, a memory 104, and a firmware storage 110 coupled to a bus 108. Exemplary computer systems 100 may include, but are not limited to, a personal computer, a network workstation, a portable computer, a handheld or palmtop computer, a personal digital assistant (PDA), a wireless communication device, a videogame system, and a digital camera.

Firmware storage 110 is a non-volatile storage device including, but not limited to, a flash memory device, an Erasable Programmable Read Only Memory (EPROM), and an Electronically Erasable Programmable Read Only Memory (EEPROM). Firmware storage 110 at least stores a firmware image which includes instructions and/or data executable by computer system 100. In one embodiment, the firmware image includes BIOS firmware for a personal computer. In another embodiment, the firmware image includes firmware stored in a firmware storage device of an expansion board installed on a personal computer. In yet another embodiment, firmware image is firmware stored in a firmware storage device of a wireless phone, PDA, or a digital camera.

In one embodiment, firmware storage 110 includes instructions and/or data in accordance with an EFI framework specification. Current firmware architectures include provisions for extending BIOS functionality beyond that provided by the BIOS code stored in a platform's BIOS device (e.g., flash memory). More particularly, the Extensible Firmware Interface enables firmware, in the form of firmware modules and drivers, to be loaded from a variety of different resources, including primary and secondary flash devices, option ROMs (Read-Only Memory), various persistent storage devices (e.g., hard disks, CD ROMs (Compact Disk-Read Only Memory), etc.), and even over computer networks. In one implementation of the EFI framework, the initialization process includes various execution phases of firmware stored on the computer system 100. These execution phases include a Pre-EFI Initialization (PED phase, a Driver Execution Environment (DXE) phase, and an EFI 1.0 execution phase. These phases enable initialization and set-up of various platform devices and services, and enable an operating system to be booted in accordance with an OS launch phase that follows the EFI 1.0 execution phase.

In one embodiment, the firmware storage 110 is a flash memory device. It is to be understood that other types of persistent storage devices for maintaining firmware code and/ or data, and the embodiments of the invention using flash devices discussed herein are merely exemplary schemes for practicing the invention.

Flash memory is a non-volatile memory technology that allows manufactures and (with the appropriate hardware/ software) end-users to electrically erase and (re)program information. Flash memory is typically erased in units of memory called blocks instead of being erased at the bit level, wherein all bits in a given block are switched to a predetermined polarity (i.e., logic level) when the block is erased. In one embodiment, the block size is 64 k. In another embodiment, the block size is 32 k. In one common type of flash memory, such as flash memory devices manufactured by the Intel Corporation, blocks of memory are erased electronically by setting all bits in a block to 1's. Data can then be written to the block by flipping individual bits to 0's to form appropriate bit patterns corresponding to the data. In other types of flash devices, the erased logic state is all 0's, and writing data to these devices comprising changing individual bits to 1's. It is noted that in conventional flash devices, individual bits cannot be flipped from a changed (i.e., set) logic level back to the erased logic level; in order to update data in a block, all of the bits have to be erased first, and then rewritten.

A storage device 106 is also coupled to bus 108, in accordance with one embodiment. Such a storage device includes, but is not limited to, a magnetic drive, an optical drive, memory, or the like. Drive based storage devices 106 use a medium to store the data. For example, an optical drive such as a DVD-ROM reads data from a DVD disk. In an alternative embodiment, storage 106 is not part of the computer system 100, but accessible by the computer system 100.

Figure 2:
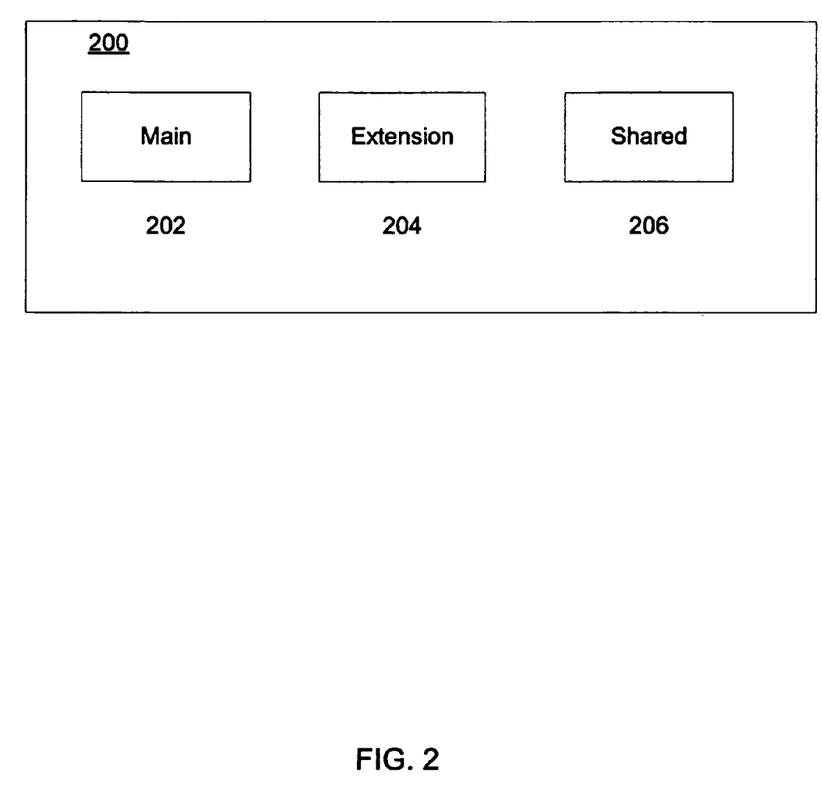
FIG. 2 is a schematic diagram of an embodiment of firmware storage.

FIG. 2 depicts an embodiment of firmware storage 200 according to an embodiment of the invention. The firmware storage 200 includes a main area 202 and an extension area 204. The main area 202 may be used to store basic firmware binaries such as BIOS. These basic firmware binaries are typically provided by IBVs or hardware manufacturers. In one embodiment, the computer system is shipped with a basic firmware binary stored in the main area 202. In another embodiment, the main area 202 is not occupied by a firmware binary at shipping but will be later updated by the user. Generally, the main area 202 is updateable such that new capabilities can be added to the basic firmware binary or deficiencies in a basic firmware binary can be overcome. For example, when a new hardware device that was not available when the basic firmware binary was created becomes available, the basic firmware binary is updateable such that the computer system would be able to use that device after updating the basic firmware binary.

Firmware applications may be stored in the extension area 204 of the firmware storage 200. Storing firmware applications in the extension area 204 does not affect what is stored in the main area 202. Exemplary firmware applications include, but are not limited to, provisioning, anti-theft, anti-virus, hardware/software asset management, and disk image management.

In one embodiment, a shared area 206 is also included in the firmware storage 200. The shared area 206 may be used as a common storage location for data or other information that accessible by the main and extension area. This shared area 206 allows for communication and shared resources between binaries of an IBV and ISV. In one embodiment, this storage may logically be made a part of the one of the other areas. For example, if storage space in the main area is full, the shared area 206 may be partitioned in such a way that at least a portion of the shared area 206 storage is seen as a logical extension of the main area and therefore only accessible by the main area.

In one embodiment of firmware storage 200, the firmware storage areas are on the same physical non-volatile storage device. Boundaries for the storage areas are determined by the location address of each of storage area. For example, the extension area and/or shared area could be space that is unused by the basic firmware binary. In this embodiment, before updating the basic firmware binary, the extension and/ or shared area should be checked to ensure that desired data is not overwritten. In another embodiment, a separate non-volatile storage device is provided for at least one storage area.

Figure 3:
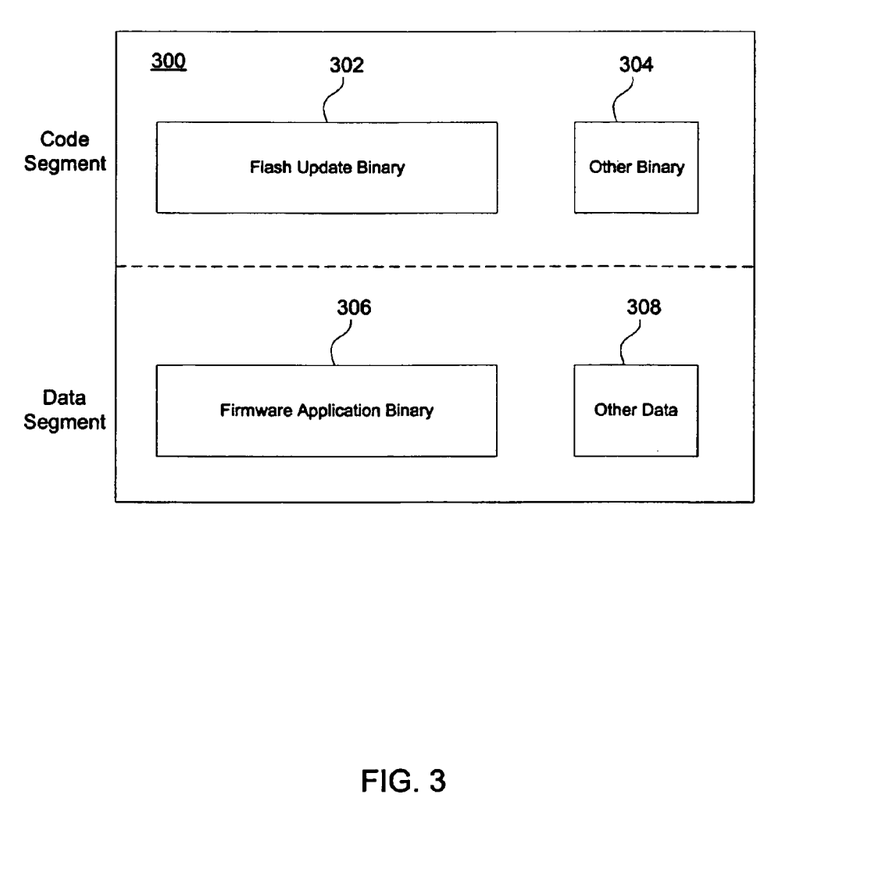
FIG. 3 is a schematic diagram of an embodiment of a firmware application installation toolkit.

FIG. 3 depicts an embodiment of a firmware application installation toolkit 300 according to an embodiment of the invention. This toolkit 300 is used in conjunction with the extension area of firmware storage. In an embodiment, the toolkit 300 is a firmware application binary. In another embodiment, the toolkit 300 is an OS application binary.

In one embodiment, the installation toolkit 300 is in the form of an executable program. In a typical executable program there are two kinds of data: 1) binaries that are executable computer instructions, which are usually regarded as the code segment, and 2) binaries that contain constant values for the code segment to access and process, which are usually regarded as the data segment. In another embodiment, the toolkit 300 is not an executable program.

The toolkit 300 of FIG. 3 includes a code segment and a data segment. The code segment consists of executable machine instructions such as flash update binary 302. The use of this binary 302 will be described in detail below. Additionally, the code segment may have other binary data 304 such as machine instructions to examine digital signatures and integration of the new data that of data segment of the toolkit 300.

The data segment includes at least one firmware application binary 306. A firmware application binary 306 of the data segment includes values for the code segment to access and process. In another embodiment, the firmware application binary is replaced by an OS application binary. The data segment may also include other data 308 including, but not limited to, digital signatures, source information, an OS application binary, or a firmware application binary.

In one embodiment the toolkit 300 is transferred as a single file. For example, the code and data segments are transferred together. In another embodiment, the toolkit 300 consists of two separate files. For example, the code and data segments are separate files. In this embodiment, the files are transferred separately.

The installation toolkit 300 may be invoked in a variety of ways. In one embodiment, the toolkit 300 is invoked as a boot option. Invoking as a boot option means that as the computer system is booting up, and therefore before the OS loads, the toolkit 300 is invoked. The boot option allows a user to access the firmware command line to invoke the toolkit 300.

In another embodiment, the toolkit 300 is invoked as an external command under the firmware command line. An exemplary command line is the EFI shell.

In one embodiment, the toolkit is downloaded from a remote server and invoked as a PXE (Pre-Boot Execution Environment) stub application. In a typical PXE process, a client machine downloads an executable binary from a specific server which is defined during a previous interaction between the client and the PXE server. After the binary is successfully downloaded, the client machine executes it. Typically, PXE stubs are used to install an operating system (OS). However, in this embodiment the PXE process is used to burn a binary (such as BIOS) instead of installing an OS.

After installation, firmware applications are usually invoked by a user via a menu item in the firmware user interface.

When an installation toolkit 300 is initialized, the computer instructions in code segment (for example, flash update binary 302) will access the data stored in data segment (for example, firmware application binary 306) and burn that data into the non-volatile memory such as flash memory. The flash updating instructions will not burn themselves into flash. After execution, only the data from the data segment is stored in the flash chip. Other data from the toolkit 300 will disappear after the system is reset.

Figure 4:
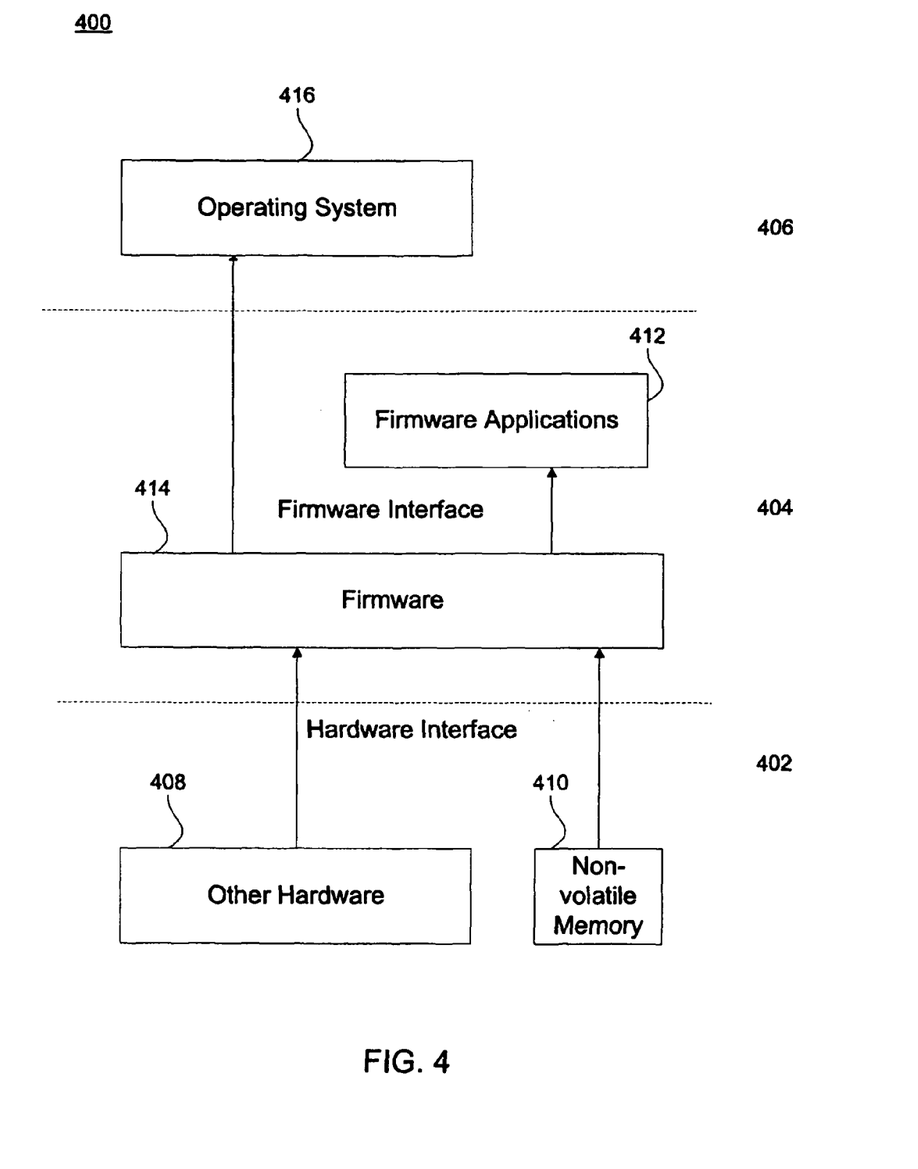
FIG. 4 is a schematic diagram of an embodiment of a firmware ecosystem.

An illustrative embodiment of a firmware ecosystem is depicted in FIG. 4. The firmware ecosystem 400 has three levels: hardware 402, firmware 404, and beyond firmware 406. These levels work together to implement the firmware application installation. The hardware level 402 includes computer hardware 408 such as a processor, memory, USB devices, etc. A non-volatile memory device 410, for example, a flash device, of the hardware level 402 serves as firmware storage for the computer system. In one embodiment, the extension area of the firmware storage may store a firmware application binary. This firmware application binary is stored permanently until it is removed from the system. The hardware level 402 interfaces with the firmware level 404. Generically, an interface is used to describe the service or capability that the relevant object can provide.

The firmware level 404 includes firmware 414. In addition, the firmware level 404 may include firmware applications 412. Exemplary firmware applications 412 include, but are not limited to, manageability solutions and installation toolkits. In one embodiment, the installation toolkit includes a firmware application. The installation toolkit uses an interface provided by the firmware 414 to write firmware application data and code into the non-volatile memory device. In one embodiment, data is serially transferred into the non-volatile memory device. More specifically, the data is transferred into the extension area. The firmware 414 also provides an interface to make the data in the extension area visible to the system.

The final level of the ecosystem 406 includes the operating system (OS) 416 of the computer system. Exemplary operating systems include Microsoft Windows, Linux, OS/2, Unix, Apple OS, and embedded variants of these operating systems. Upon successfully boot-up and running of the firmware, control is transferred to the OS 416.

Figure 5:
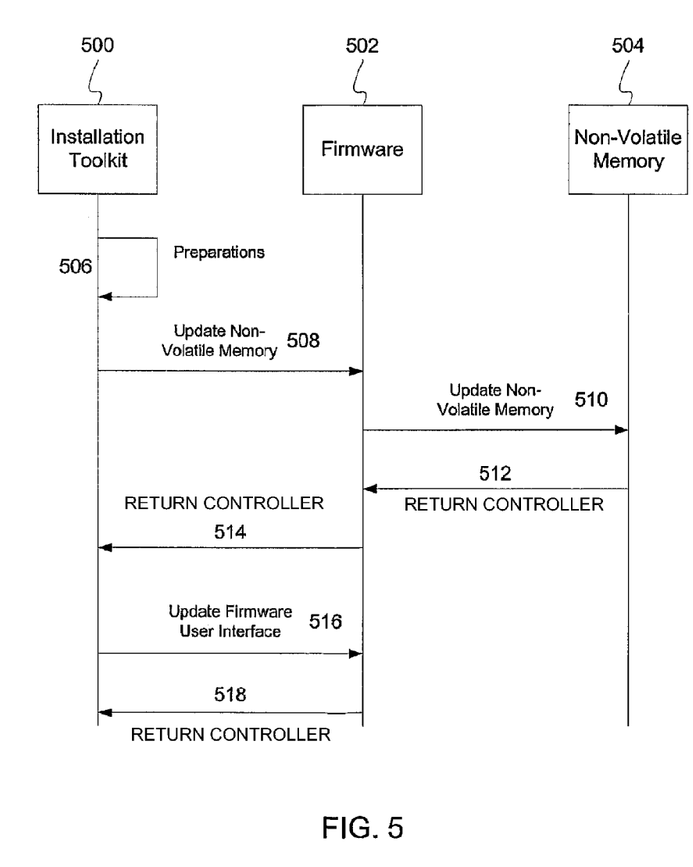
FIG. 5 is a flow diagram illustrating the logic and operations performed by an embodiment of the invention.

With reference to the flow diagram of FIG. 5, one embodiment of the present invention operates in the following manner to update firmware stored in a firmware storage device of a computer system. In one embodiment, before writing data from the installation toolkit 500 into the extension area of non-volatile memory, some preparatory tasks are performed at 506. In an EFI framework system, preparatory tasks include checking the digital signature of the installation toolkit 500 to ensure that the toolkit 500 is from a trusted source and checking the data integrity of the toolkit 500 to ensure that the data was not modified, corrupted, or cracked. In another embodiment, no preparatory tasks are taken and the toolkit 500 is assumed to be valid.

Using a firmware interface, the installation toolkit 500 will update the firmware 502 stored in a non-volatile memory at 508. In one embodiment, only new data is added to the firmware. In another embodiment, all data in the firmware is overwritten with the new data. The firmware interface is a function call provided by the firmware to achieve the flash updating task. The firmware 502 then invokes a hardware interface to write the data to the non-volatile memory at 510. After the hardware has updated the non-volatile memory 504, control of the system is returned to the firmware at 512. Once the firmware 502 has control again, control may be passed back to the installation toolkit at 514.

In another embodiment, the hardware interface is invoked directly to update the flash without using the firmware interface. After the hardware has updated the non-volatile memory 504, control of the system may be returned to the installation toolkit at 514.

The firmware data that is now stored in the extension area is may still not be visible or accessible to the BIOS or the end user. The main area may have to be updated such that the new data stored in the extension area is visible. In one embodiment, in an EFI framework system, a Human Interface Infrastructure (HII) is used for dynamic BIOS menu insertion which makes the new flash data visible to end user at 516.

In an embodiment, a driver is used for boot option modification, which makes the new data visible to main area at 516. However, the BIOS itself is not updated. In one embodiment, the driver is a DXE driver. In this embodiment, modifications to both the BIOS menu and boot option take place during DXE dispatch phase (leveraging the DXE dispatcher) which occurs during each system boot. The DXE dispatcher triggers modifications to both the BIOS menu and boot option every time system boots.

In another embodiment, the BIOS is updated permanently and will not need to be modified at each system boot. After the firmware interface has been updated control is returned to the installation toolkit at 518.

Figure 6:
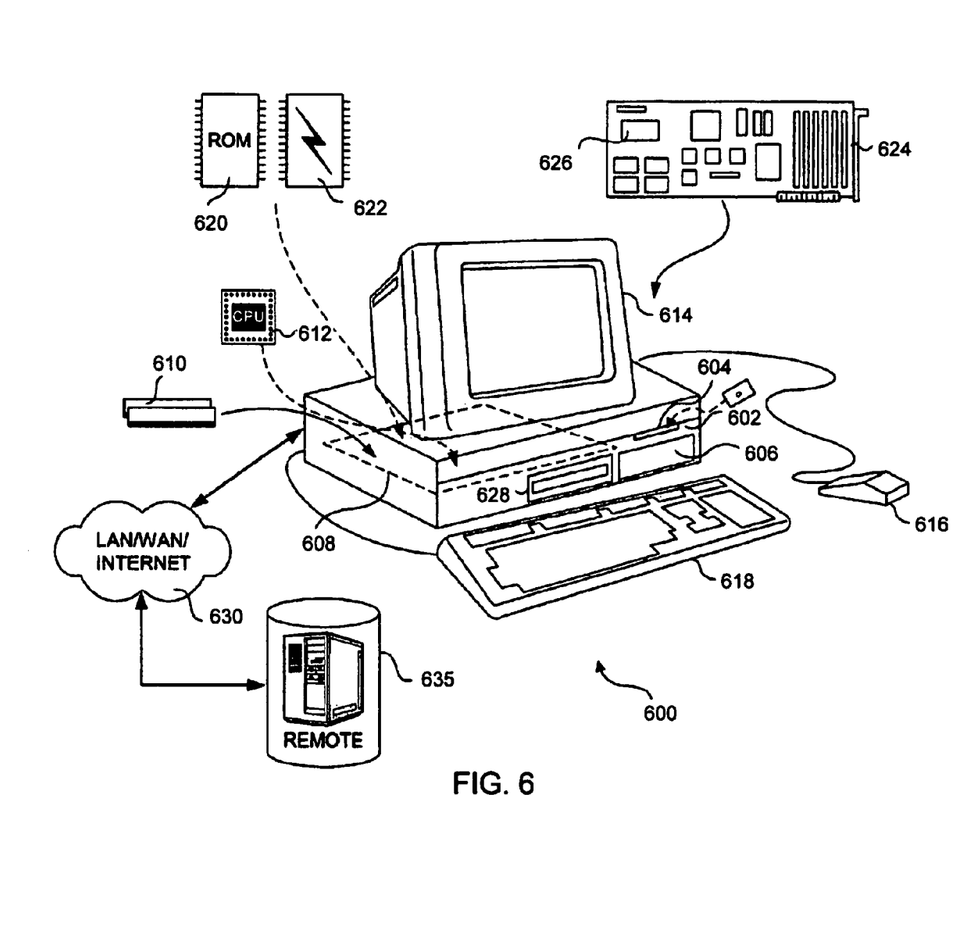
FIG. 6 is a diagram illustrating an embodiment of a computer system for implementing an embodiment of the present invention.

FIG. 6 illustrates an embodiment of an exemplary computer system 600 for practicing an embodiment of the invention described herein. Computer system 600 is generally illustrative of various types of computer devices, including personal computers, laptop computers, workstations, servers, etc; for simplicity, only the basic components of the computer system are discussed herein. Computer system 600 includes a processor chassis 602 in which various hardware components are housed, including a floppy disk drive 604, a hard disk 606, a power supply (not shown), and a motherboard 608 populated with appropriate integrated circuits including system memory 610 coupled to one or more processors 612. Memory 610 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Processor 612 may be a conventional microprocessor including, but not limited to, an Intel Corporation x86, Pentium, XScale, or Itanium family microprocessor, a Motorola family microprocessor, an IBM PowerPC microprocessor or the like. Hard disk 606 may comprise a single unit, or multiple units, and may optionally reside outside of computer system 600. The system also includes a boot firmware device on which firmware is stored, which may typically comprise non-volatile memory such as a ROM device 620 or a flash device 622. The motherboard may include other firmware devices as well (not shown). In general, the system's processors will comprise 32- or 64-bit architectures, and the system memory will include physical addressing schemes appropriate to the processor(s), and may be accessed via corresponding address and data buses to which the processor(s) and the memory are connected.

A monitor 614 is included for displaying graphics and text generated by firmware, software programs and program modules that are run by computer system 600, such as system information presented during system boot. A mouse 616 (or other pointing device) may be connected to a serial port, USB port, or other like bus port communicatively coupled to CPU(s) 612. A keyboard 618 is communicatively coupled to motherboard 608 in a similar manner as mouse 616 for user entry of text and commands. In one embodiment, computer system 600 also includes a network interface card NIC or built-in NIC interface (not shown) for connecting computer system 600 to a computer network 630, such as a local area network (LAN), wide area network (WAN), or the Internet.

The illustrated embodiment further includes an optional add-in card 624 that is coupled to an expansion slot of motherboard 608. In one embodiment, add-in card 624 includes an Option ROM 626 on which firmware is stored. Computer system 600 may also optionally include a compact disk-read only memory ("CD-ROM") drive 628 into which a CD-ROM disk may be inserted so that executable files, such as an operating system, and data on the disk can be read or transferred into system RAM 610 and/or hard disk 606. Other mass memory storage devices may be included in computer system 600.

In another embodiment, computer system 600 is a handheld or palmtop computer, which are sometimes referred to as personal digital assistants (PDAs), that may be used with the present invention. Handheld computers may not include a hard disk or other mass storage, and the executable programs are loaded from a corded or wireless network connection into memory 610 for execution by processor 612. A typical computer system 600 will usually include at least a processor 612, memory 610, and a bus (not shown) coupling the memory 610 to the processor 612.

It will be appreciated that in one embodiment, computer system 600 is controlled by operating system software that includes a file management system, such as a disk operating system, which is part of the operating system software. For example, one embodiment of the present invention utilizes Microsoft Windows as the operating system for computer system 600. In another embodiment, other operating systems such as, for example, but not limited to the Apple Macintosh operating system, the Linux operating system, the Microsoft Windows CE operating system, the Unix operating system, the 3Com Palm operating system, or the like may also be used in accordance with the teachings of the present invention.

Thus, embodiments of this invention may be used as or to support a firmware and software code executed upon some form of processing core (such as processor 612) or otherwise implemented or realized upon or within a machine-readable medium. A machine-readable medium includes any mechanism for storing or transmitting information in a form readable by a machine (e.g., a computer). For example, a machine-readable medium can include, but not limited to, a read only memory (ROM), a random access memory (RAM), a magnetic disk storage media, an optical storage media, a flash memory device, or the like. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
    storing a firmware binary file in an extension area of a non-volatile storage device of a computer system, wherein the non-volatile storage device includes a shared area to provide communication and shared resources between the extension area and a Basic Input/Output System (BIOS); and
    enabling the BIOS of the computer system to access the stored firmware binary file by making the stored firmware binary file in the extension area visible to the BIOS.

2. The method of claim 1, wherein storing the firmware binary file includes invoking a firmware interface via an installation toolkit.

3. The method of claim 2, wherein storing the firmware binary file further includes the firmware interface invoking a hardware interface to write the firmware binary file in the extension area.

4. The method of claim 1, wherein storing the firmware binary file includes invoking a hardware interface via an installation toolkit.

5. The method of claim 1, wherein the firmware binary file is a firmware application binary.

6. The method of claim 1, wherein the firmware binary file is an operating system application binary.

7. The method of claim 1, wherein the computer system operates in accordance with the Extensible Firmware Interface (EFI) framework specification.

8. The method of claim 7, wherein enabling the BIOS of the computer system comprises using a Driver Execution Environment (DXE) dispatcher to trigger the BIOS to access the stored firmware binary file.

9. The method of claim 6, wherein the BIOS is stored in a main area of the nonvolatile storage device.

10. The method of claim 6, further comprising performing preparatory tasks.

11. The method of claim 10, wherein performing preparatory tasks includes checking a digital signature of the firmware binary file.

12. The method of claim 10, wherein performing preparatory tasks includes checking the firmware binary file for data integrity.

13. A computer system, comprising:
    a processor; and
    a first memory device operatively coupled to the processor on which a Basic Input/Output System (BIOS) is stored;
    a second memory device operatively coupled to the processor on which instructions are stored which when executed by the processor perform operations comprising:
        storing a firmware binary file in an extension area of a non-volatile storage device of a computer system, wherein the non-volatile storage device includes a shared area to provide communication and shared resources between the extension area and a Basic Input/Output System (BIOS); and
        enabling BIOS of the computer system to access the stored firmware binary file by making the stored firmware binary file in the extension area visible to the BIOS.

14. The computer system of claim 13, wherein the first memory device includes instructions for operating the computer system in accordance with the Extensible Firmware Interface (EFI) framework specification.

15. The computer system of claim 13, wherein the first and second memory devices are the same device.

16. An article of manufacture, comprising:
a non-transitory machine-readable medium on which a plurality of instructions are stored, which when executed perform operations comprising:
storing a firmware binary file in an extension area of a non-volatile storage device of a computer system, wherein the non-volatile storage device includes a shared area to provide communication and shared resources between the extension area and a Basic Input/Output System (BIOS); and
enabling the BIOS of the computer system to access the stored firmware binary file by making the stored firmware binary file in the extension area visible to the BIOS.

17. The article of manufacture of claim 16, wherein storing the firmware binary includes invoking a firmware interface.

18. The article of manufacture of claim 17, wherein storing the firmware binary further includes the firmware interface invoking a hardware interface to write a binary file in the extension area.

19. The article of manufacture of claim 16, wherein the firmware binary file is a firmware application binary.

20. The article of manufacture of claim 16, wherein the firmware binary file is an operating system application binary.

21. The article of manufacture of claim 16, wherein the computer system operates in accordance with the Extensible Firmware Interface (EFI) framework specification.

\* \* \* \* \*

UNITED STATES PATENT AND TRADEMARK OFFICE
CERTIFICATE OF CORRECTION

| | | |
|---|---|---|
| PATENT NO. | : 8,539,213 B2 | Page 1 of 1 |
| APPLICATION NO. | : 10/550473 | |
| DATED | : September 17, 2013 | |
| INVENTOR(S) | : Zhang et al. | |

It is certified that error appears in the above-identified patent and that said Letters Patent is hereby corrected as shown below:

In the Specifications

In column 2, at line 60 delete, "(PED" and insert -- (PEI) --.

Signed and Sealed this
Twenty-second Day of April, 2014

Michelle K. Lee
*Deputy Director of the United States Patent and Trademark Office*